Figure 1:
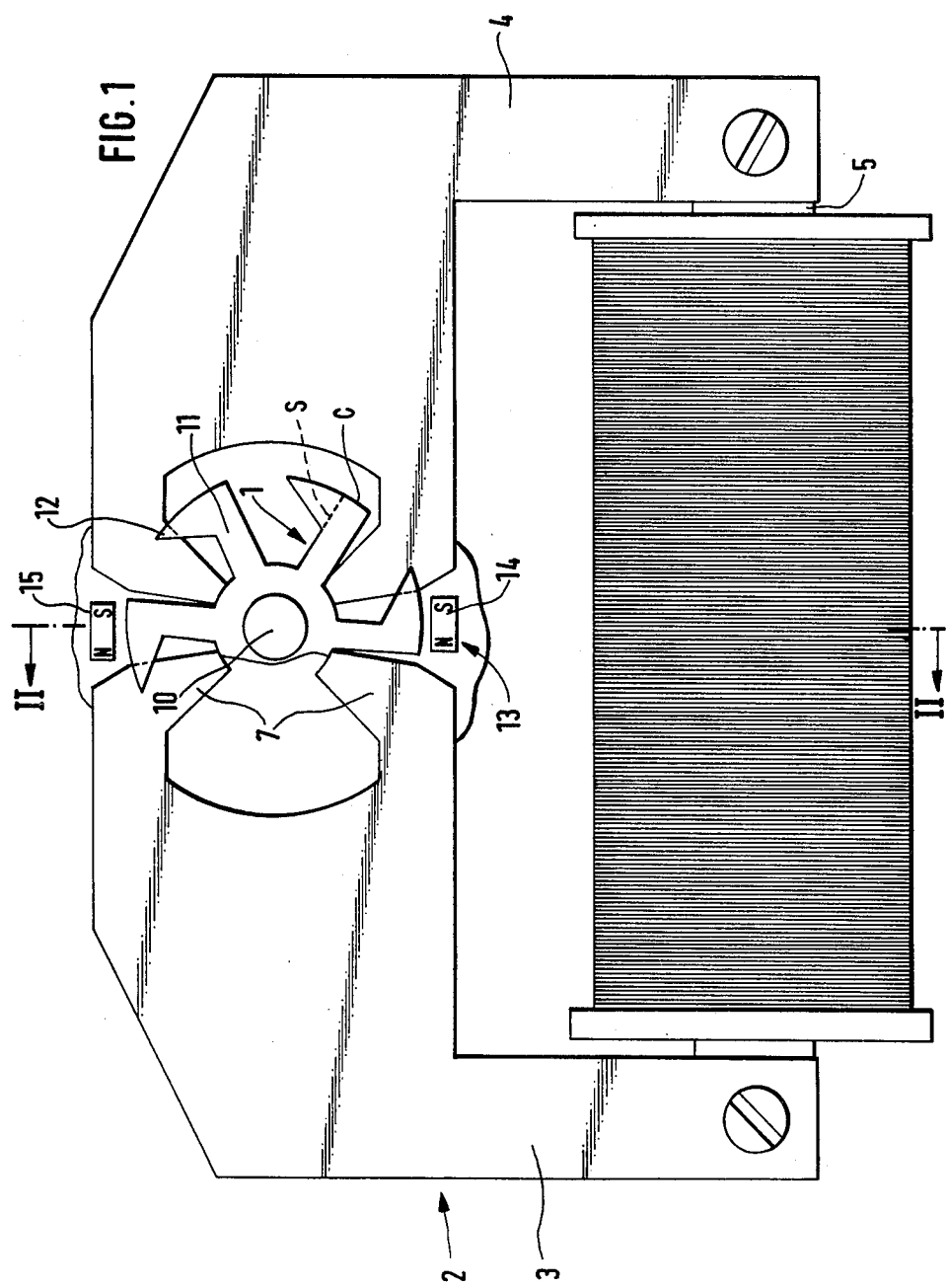

United States Patent [19]

Sudler et al.

[11] 4,201,929
[45] May 6, 1980

[54] SINGLE PHASE STEPPING MOTOR

[75] Inventors: Roland Sudler, Frankfurt; Walter Happel, Mörfelden, both of Fed. Rep. of Germany

[73] Assignee: Quarz-Zeit AG, Frankfurt am Main, Fed. Rep. of Germany

[21] Appl. No.: 877,101

[22] Filed: Feb. 13, 1978

[30] Foreign Application Priority Data

Feb. 19, 1977 [DE] Fed. Rep. of Germany ....... 2707251

[51] Int. Cl.² .............................................. H02K 37/00
[52] U.S. Cl. .................................. 310/49 R; 310/117; 310/113
[58] Field of Search .......................... 310/49, 162–165, 310/154, 261

[56] References Cited

U.S. PATENT DOCUMENTS

| | | | |
|---|---|---|---|
| 2,081,411 | 5/1937 | Stoller et al. | 310/163 |
| 2,546,729 | 3/1951 | DeMillar | 310/49 X |
| 3,984,711 | 10/1976 | Kordik | 310/154 X |

Primary Examiner—Donovan F. Duggan
Attorney, Agent, or Firm—Martin A. Farber

[57] ABSTRACT

A single phase stepping motor, particularly for clocks, with a rotor with several pole teeth, of which each pole tooth comprises a main pole and an auxiliary pole formed on the latter, and with a stator, the latter being made of two stator parts connected with one another via a bridge part, the latter carrying the excitation winding, of which each stator part on its free end transfers into an equal or smaller number (in comparison to the rotor pole number) of stator pole teeth, the stator pole teeth being directed towards the face side of the rotor, as well as a permanent magnetic circuit arranged between the stator pole teeth by means of which circuit the rest position of the rotor is determined with the unexcited condition of the stator. Each auxiliary pole comprises a projection extending in the circumferential direction in the area of the edge of the rotor and the permanent magnetic circuit comprises at least one permanent magnet, the latter being arranged beyond the circumference of the rotor and extending with its pole axis approximately tangential to the rotor such that a part of the magnetic lines of force close across the circumferential edge zone of a main pole and auxiliary pole of the rotor.

7 Claims, 2 Drawing Figures

SINGLE PHASE STEPPING MOTOR

The invention relates to a single phase stepping motor, particularly for clocks, with a rotor with several pole teeth, of which each pole tooth comprises a main pole and an auxiliary pole formed on the latter, and with a stator, the latter being made of two stator parts connected with one another via a bridge part, the latter carrying the excitation winding, of which each stator part on its free end transfers into an equal or smaller number (in comparison to the rotor pole number) of stator pole teeth, the stator pole teeth being directed towards the face side of the rotor, as well as a permanent magnetic circuit arranged between the stator pole teeth by means of which circuit the rest position of the rotor is determined with the unexcited condition of the stator.

Various single phase motors of this species already have been proposed. With respect to the known single phase stepping motors they have a lower energy consumption, a higher efficiency and a smaller construction volume. Moreover they can be produced simpler than the known motors.

It is an object of the present invention to further simplify the production of these single phase stepping motors and further to reduce the construction height.

This object is aided in accordance with another object of the invention in the manner that each auxiliary pole (12) comprises a projection extending in the peripheral or circumferential direction in the region of the edge of the rotor (1) and the permanent magnetic circuit (13) comprises at least one permanent magnet (14; 15), the permanent magnet being arranged outside of the circumference of the rotor extending with its pole axis approximately tangential to the rotor (1) such that a portion of the magnetic lines of flux close the circuit across the peripheral or circumferential edge zone of one main pole and auxiliary pole of the rotor (1).

By this measure it is attained, that the permanent magnet or permanent magnets, respectively, are no longer arranged above or below the rotor face surface, whereby the construction height is allowed to be reduced. Beyond that also the mounting or installation of the permanent magnet or permanent magnets, respectively, with the embodiment in accordance with the invention is easier and simpler to perform than with permanent magnets arranged over or under the rotor face surface.

According to a prefered embodiment of the invention the edges of each main pole (11) and of each auxiliary pole (12), which edges face away from the rotor axle, have an edge course which is adjusted or shaped conforming to the circumference of the rotor.

In this manner also with permanent magnets of smaller magnetic field intensity, higher holding moments may be attained, or respectively, permanent magnets with higher field intensity can be arranged with a comparatively large spacing with relative to the rotor, which brings about advantages in production and manufacture. On the same basis it is recommended to provide a longitudinally elongated or lengthwise extended auxiliary pole (12), the base side of which is smaller than the effective length of the main pole (11).

In order to prevent a non-symmetrical loading of the rotor by the permanent magnetic circuit which would lead to increased frictional losses in the rotor bearings, the permanent magnetic circuit (13) most suitably is made of two permanent magnets (14 and 15) which are located radially opposite one another.

Additionally it has proven suitable to use permanent magnets made of a lanthanide-ferromagnetic alloy. Such types of alloys have a particularly high energy product (BH) max., so that permanent magnets made of this material can be held very small, which favorably effects the construction height and the weight of the motor.

Figure 2:
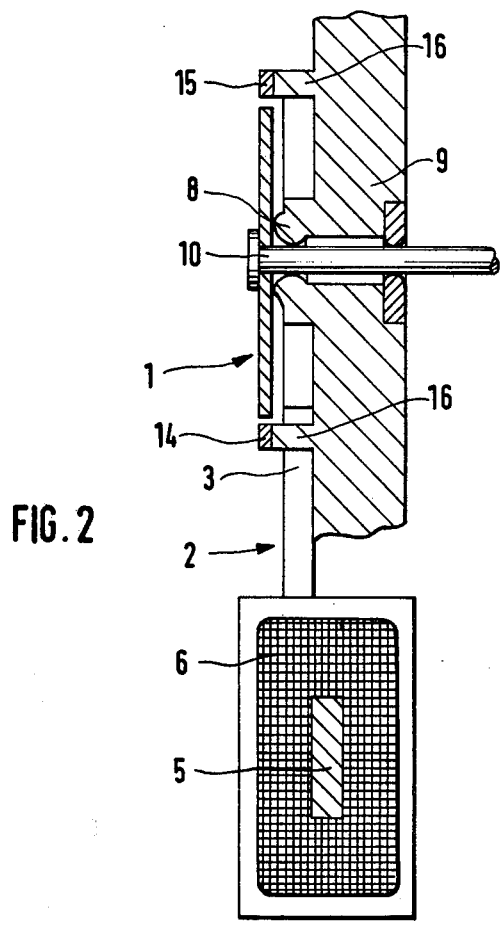

With the above and other objects and advantages in view, the present invention will become more clearly understood in connection with the following detailed description of a preferred embodiment, when considered with the accompanying drawings, of which:

FIG. 1 is a partially sectioned view of a single phase stepping motor with a six polar rotor and a four polar stator; and FIG. 2 is a section through the single phase stepping motor according to FIG. 1 taken along the lines II—II thereof; each in substantially enlarged illustration.

Referring now to the drawings, a single phase stepping motor in accordance with the present invention comprises a six polar rotor 1 and a stator 2, the latter in turn comprising two stator parts 3 and 4 as well as a bridge part 5 with an excitation coil 6, the bridge part connecting both stator parts 3 and 4 with one another.

Each stator part 3 and 4, respectively, carries on its end adjacent to the rotor 1 two circularly annular sector shaped stator pole teeth 7. The inwardly directed free ends, respectively, of the stator pole teeth 7 of both stator parts 3 and 4 project against a projection or rim 8 of a bearing plate 9 for the rotor shaft 10, the free ends of the stator pole teeth being formed for reception and seating therewithin of the rim 8 and thus the bearing 9 for the rotor shaft 10. The stator pole teeth of the respective stator parts 3 and 4 are formed and arranged relative to each other such that all the free ends thereof constitute sectors of a common cylindrical surface, which can engage and retain the outer cylindrical surface portion of the projecting rim 8 of the bearing 9. Adjacent teeth 7 of the two stator parts 3 and 4, respectively, may be arranged angularly spaced from each other by the same angle as that of two adjacent rotor poles. As particularly evident from FIG. 2, both stator parts 3 and 4 are arranged in one plane common to them, whereas the rotor 1 rotates in a plane which is parallel thereto. The stator parts 3, 4 and 5 are produced by stamping out or punching out from a Hyperm-766 plate or sheet metal.

The rotor 1, which likewise is stamped out or punched out from a plate or sheet metal, the latter being made of a soft magnetic material (or low retentive material) of low coercive force or retentivity, for example Hyperm-766, comprises six approximately rectangularly shaped main poles 11, the main poles each passing or changing in the region of its edge into a triangular-like projection 12 extending in the circumferential direction, which projection 12 forms and constitutes the respective auxiliary pole. Each auxiliary pole 12 is arranged on the main pole 11 which is associated therewith in a manner such that their edges which face away from the rotor axle or axis have an edge course c which is adjusted or shaped conforming to or on the circumference of the rotor, the rotor circumference in the present case being formed as a circular arc or sector although not limited thereto. As evident, the auxiliary poles 12 are formed comparatively lengthwise extended or longitudinally elongated and their imaginary base side S is smaller than the effective length of the respective main pole 11.

The permanent magnetic circuit 13 contains two permanent magnets 14 and 15 which are radially opposite one another, which permanent magnets, as particularly evident from FIG. 2, each sit on one projection 16 (FIG. 2), the latter being formed on or attached to the carrier plate 9. Both permanent magnets 14 and 15 are disposed outside of or beyond the circumference of the rotor, whereby their respective pole axis extends tangential to the rotor 1. As shown in FIG. 2, they lie in the plane of the rotor 1. Their lines of force or flux close the circuit across the peripheral or circumferential edge zone respectively of one main pole and an auxiliary pole of the rotor 1.

One side of the rotor 1 may rotatingly abut the rounded front side of the projecting rim 8 of the bearing 9, the bearing 8, 9 being made of a (magnetically non-conducting) synthetic or plastic material. The rotor shaft 10, which is formed with a collar holding the opposite side of the rotor 1, rotatably passes through a bore in the bushing or bearing 9. Both ends of the bore are formed with an inwardly narrowed rounded portion substantially equal to the circumference of the rotor shaft 10 for maintaining the precise alignment of the rotor shaft 10.

In the excited condition the rotor 1 is located in a position, as illustrated in FIG. 1. In this position the magnetic resistance of the permanent magnetic circuit 13 is the smallest. As soon as the stator 2 is excited the rotor 1 is rotated by means of the auxiliary poles 12 into a position in which the rotor main poles 11 come to lie over the stator pole teeth 7. Now to auxiliary poles 12 project into the range of the permanent magnetic circuit 13. If the excitation of the stator is now terminated, then the rotor 1 continues to turn into the illustrated position by means of the auxiliary poles 12.

It may be pointed out that the solution in accordance with the invention is also suitable in the same manner for single phase stepping motors with which the stator parts are not arranged in one common plane, but rather are disposed in two planes which are parallel to one another and the rotor is disposed between these two stator parts.

While there has been disclosed several embodiments of the invention, these embodiments are given by example only and not in a limiting sense.

We claim:

1. In a single phase stepping motor, particularly for clocks, with a rotor with several pole teeth, of which each pole tooth comprises a main pole and an auxiliary pole formed on the latter, and with a stator, the latter being made of two stator parts connected with one another via a bridge part, the latter carrying the excitation winding, of which each stator part on its free end transfers into an equal or smaller number (in comparison to the rotor pole number) of stator pole teeth, the stator pole teeth being directed towards the face side of the rotor, as well as a permanent magnetic circuit arranged between the stator pole teeth by means of which circuit the rest position of the rotor is determined with the unexcited condition of the stator, the improvement wherein the rotor defines a circumferential edge, each of the auxiliary poles of the rotor comprising a projection extending in the circumferential direction in the region of the edge of the rotor, the stator pole teeth and the rotor pole teeth radially overlap so that respective face sides face each other, the permanent magnetic circuit comprises at least one permanent magnet spaced apart from said stator and from said rotor, said at least one permanent magnet being arranged beyond the circumferential edge of the rotor and having a pole axis extending substantially tangential to the rotor and a size such that a part of the magnetic lines of force close across a zone of the circumferential edge solely of one main pole and corresponding auxiliary pole formed on the latter constituting a single rotor pole of the rotor, respectively, means including the excitation winding for alternatingly exciting the stator parts.

2. The single phase stepping motor as set forth in claim 1, wherein a rotor axle mounts the rotor, each said main poles and said auxiliary poles have edges, said edges point away from said rotor axle, said edges have an edge course adjusted to the circumference of the rotor.

3. The single phase stepping motor as set forth in claim 1, wherein said auxiliary pole is elongated lengthwise, said auxiliary pole has a base side, said imaginary base side is smaller than the effective length of said main pole.

4. The single phase stepping motor as set forth in claim 1, wherein said permanent magnetic circuit comprises two permanent magnets, said permanent magnets are mounted radially opposite one another.

5. The single phase stepping motor as set forth in claim 1, wherein said at least one permanent magnet is made of a lanthanide-ferromagnetic alloy.

6. The single phase stepping motor as set forth in claim 1, wherein said permanent magnet is a bar magnet.

7. In a single phase stepping motor, particularly for clocks, with a rotor with several pole teeth, of which each pole tooth comprises a main pole and an auxiliary pole formed on the latter, and with a stator, the latter being made of two stator parts connected with one another via a bridge part, the latter carrying the excitation winding, of which each stator part on its free end transfers into an equal or smaller number (in comparison to the rotor pole number) of stator pole teeth, the stator pole teeth being directed towards the face side of the rotor, as well as a permanent magnetic circuit arranged between the stator pole teeth by means of which circuit the rest position of the rotor is determined with the unexcited condition of the stator, the improvement wherein the rotor defines a circumference and an edge, each of the auxiliary poles of the rotor comprises a projection extending in the circumferential direction in the region of the edge of the rotor, the stator pole teeth and the rotor pole teeth radially overlap so that respective face sides face each other, the permanent magnetic circuit comprises at least one permanent magnet, said at least one permanent magnet being arranged beyond the circumference of the rotor and having a pole axis extending substantially tangential to the rotor such that a part of the magnetic lines of force close across a zone of the circumferential edge of one main pole and corresponding auxiliary pole of the rotor,
means including the excitation winding for alternatingly exciting the stator parts,
a bearing plate is mounted on the free ends of said stator parts,
a rotor axle is mounted in said bearing plate,
said rotor is mounted on said rotor axle and is parallel to said stator parts,
said bearing plate is made of a magnetically non-conducting material,
said at least one permanent magnet is mounted on said bearing plate.

* * * * *